Nov. 5, 1968   C. E. LOCKE ET AL   3,409,530
HELICAL ELECTRODE
Filed Oct. 20, 1965
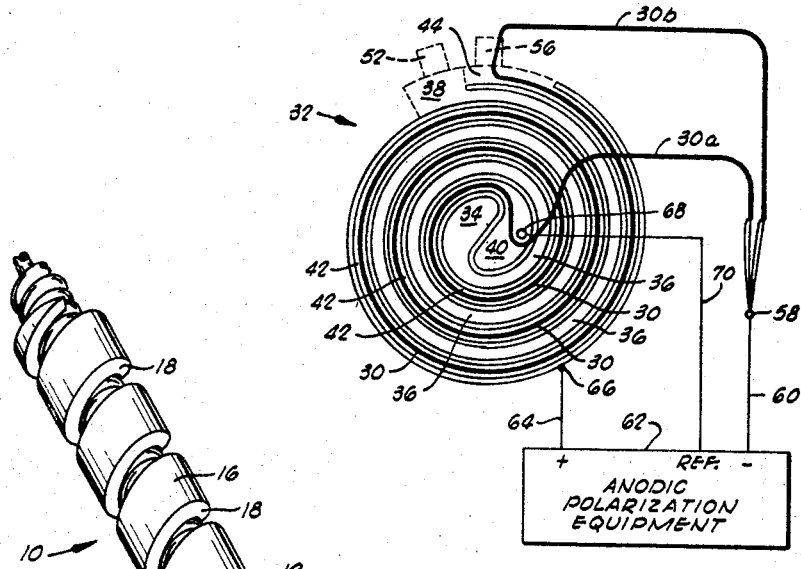
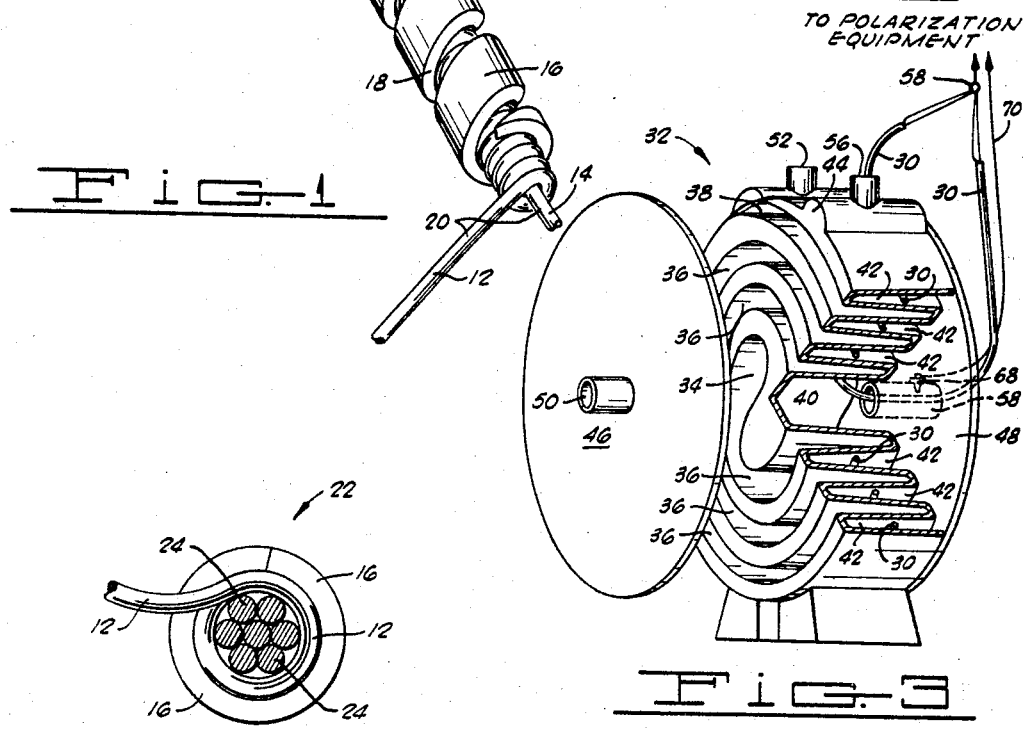
INVENTORS.
CARL E. LOCKE &
GERALD D. HARRAL
BY
William J. Miller
ATTORNEY

United States Patent Office 3,409,530
Patented Nov. 5, 1968

3,409,530
HELICAL ELECTRODE
Carl E. Locke, Ponca City, and Gerald D. Harral, Kildare, Okla., assignors to Continental Oil Company, Ponca City, Okla., a corporation of Delaware
Filed Oct. 20, 1965, Ser. No. 498,421
11 Claims. (Cl. 204—196)

ABSTRACT OF THE DISCLOSURE

An electrode for use in corrosion protection systems comprising a helical winding of suitable electrically conductive material discontinuously covered by an insulator material to allow contact between the conductive material and the surrounding solution, said electrode being flexible to a degree to allow for ease of installation within varied vessel interior configurations, and said electrode having sufficient exposed surface area for providing sufficient throwing power for operation in said corrosion protection systems.

---

This invention relates to improvements in the art of corrosion protection through potential control, and more particularly, but not by way of limitation, it relates to an improved electrode for use in the corrosion protection of metal-corrosive solution systems.

The prior art includes numerous electrodes for use in corrosion control systems. However, inspection reveals that these are largely anode electrodes for use in cathodic protection systems. A cathodic system is a well-known type of corrosion protection wherein very heavy electrical currents are applied between a metal in contact with a corrosive liquid, and an anode electrode which is also immersed in contact with the liquid. In such systems the electrical current is passed such that the metal is a cathode and the immersed electrode is the anode. In these systems the anode electrodes are subject to hydrogen embrittlement, consumption, etc., and the difficulties inherent with the particular type of system are different from the problems to be overcome in still other types of controlled potential protection systems as will be described.

In anodic polarization systems or controlled potential systems which apply both anodic and cathodic currents, it has been found that certain inherent difficulties can be overcome by proper construction of the auxiliary electrode. In anodic polarization systems, corrosion protection is effected by passing an electrical current between the metallic vessel, acting as an anode, through the corrosive solution to a cathode electrode immersed therein. The applied electric current is controlled by an electrical control system which is responsive to the potential of the metallic vessel. The vessel potential is sensed by a suitable standard electrode which is also in electrical contact with the corrosive solution, preferably through the medium of a salt bridge juncture. Such method and apparatus for anodic polarization corrosion protection is the subject of U.S. Patent No. 3,127,337, entitled "Anodic Passivation System"; issued on Mar. 31, 1964 to Conger et al. and assigned to the present assignee.

Anodic polarization equipment is often used with storage, transportation, processing, and other forms of vessels which must contain highly caustic or acidic solutions such as concentrated sulphuric acid, lithium hydroxide, nitric acid, phosphoric acid, sulphonate solutions, etc. In certain forms of vessels the geometrical configuration of the vessel interior is highly complex and special measures must be instituted in order to provide corrosion protection throughout all of the interior wall space of the vessels. In order to provide adequate corrosion protection it becomes necessary to employ an auxiliary or cathode electrode which has a large exposed surface area and which extends to within reasonable distances of all interior wall surfaces. Hence, even though the throwing power of anodic systems is extremely good, as compared to the prior protection systems, this throwing power may still be somewhat limited when applied within such geometrically complex interior configurations. In other controlled potential protection systems, such as cathodic polarization systems and systems employing alternate anodic and cathodic current application, the electrode "throwing" power becomes even more acute. Hence, such systems derive especial benefit from the use of an auxiliary electrode which has the capability of being inserted to within close proximity of all geometrically complex interior space enclosures.

The present invention contemplates an electrode for use in corrosion protection systems which can be easily inserted within highly confined interior spaces and varied geometric configurations. The electrode is comparatively small in dimension and yet provides a large exposed surface area, thus increasing the current throwing power throughout an interior space or volume and the electrode is flexible to a degree which allows ease of installation within varied vessel interior configurations. More particularly, the electrode is formed as a helical winding of suitable electrically conductive material which is overlaid with an insulator material, and the insulator material is discontinuous in its coverage such that the conductive material is free to contact the surrounding solution.

It is an object of the present invention to provide a flexible, insulated electrode.

It is also an object of the present invention to provide such an electrode for insertion in certain types of metallic vessels having complex interior configurations, such as pipes, heat exchange apparatus, coil apparatus, vessels containing agitation apparatus, etc.

It is further an object of this invention to provide a flexible electrode which has a large exposed surface area and is relatively resistant to kinking and bowing during positioning or other manipulation.

It is still further an object of the present invention to provide a flexible, high-current electrode which is insulated at spaced intervals which are suitable for maintaining the electrode out of contact with any adjacent metallic structures.

Finally, it is an object of this invention to provide an auxiliary electrode for corrosion protection systems which exhibits high current capability, optimum "throwing" power, and the capability of being lead, pushed or suitably retained within confined liquid passages while being maintained from contact with the interior walls of the passages.

Other objects and advantages of the invention will be evident from the following detailed description when read in conjunction with the accompanying drawings which illustrate the invention.

In the drawings:

FIG. 1 is a perspective view of a short section of flexible electrode;

FIG. 2 is a transverse sectional view through an alternative form of the electrode having plural center conductor members;

FIG. 3 is an exploded perspective view of a spiral heat exchanger partially cut away to show the manner of utilization of the insulated, flexible electrode; and FIG. 4 is a schematic diagram of the auxiliary or cathode electrode in operational use within the heat exchanger spiral.

Referring now to the drawings in detail, FIG. 1 shows a portion of an electrode 10. It should be understood that the electrode 10 can be made to any length desired and this will depend upon the particular application of the device. The electrode 10 is formed by winding a suitable metal conductor or wire 12 into a helical coil such that adjacent windings are in proximate or close contact. There are various ways in which the helically wound wire 12 can be formed, and one method which has proven suitable is by winding the metal wire 12 over a mandrel in a lathe. The material employed for the coiled wire 12 may be any of the metals suitable for use as electrodes in corrosion protection systems, particularly anodic passivation systems. For example, platinum wire may be used or suitable platinum clad brass wire, and there are many other inert materials which would be suitable as electrode material; the important factor being to choose a metallic material which is not consumable with the particular corrosive solution in which the electrode will be used.

The helically coiled wire 12 provides a very much increased exposed area to the surrounding liquid as compared with any solid-type electrodes of similar volume. However, in order to increase the exposed area still further and to increase the conductor volume as well as the current carrying capabilities, an interior conductor, such as an interior wire 14, may be inserted lengthwise through the helical coil 12. In the formation of the electrode, the coil wire 12 may be continually, helically wrapped on the interior wire 14, or the interior wire 14 can be suitably inserted and fastened after the formation of the helical winding 12. In the event of the second procedure, it will usually be necessary to make spot welds at intervals along the helical coil 12 such that good contact is assured between coil 12 and the interior wire 14. The spot weld procedure may be desirable in any event so that good contact between the elements is assured. It should be understood too that the flexibility and current requirements of certain applications will not require a center conductor or interior wire 14 within the helical coil 12.

The helical coil 12 is then overlaied with an insulative, helical sleeve or sheath 16. The insulative sleeve 16 is overlaid in such a manner that a continuous gap 18 exists between the helical turns so that sufficient flow-through contact can be maintained between the surrounding liquid and the conductor elements, i.e., helical wire 12 and the interior wire 14. The insulative sheath 16 is formed from a chemically inert material which is insulative electrically and, to a degree, thermally; for example, plastic materials known as Teflon or Kel-F have been used to good advantage. A tubular piece of the suitable stock is cut in a continuous helical pattern, preferably having a helical angle greater than that of helical coil 12, and it is then wound on the conductor or helical coil 12. By choosing the dimensions such that the inner diameter of the plastic tube 16 is slightly smaller than the outside diameter of the helical coil 12, the helical insulator 16 will seek a seating along the helical coil 12 such that the gaps 18 must exist between each of the helical turns. The outer diameter of the insulator helix 16 is only limited by the physical clearance available, that is, the particular application wherein the electrode 10 is to be employed.

The end leads 20 of the helical coil 12 and the interior conductor 14 may be suitably insulated (not shown) for leading out to a power terminal connection, or in the case where only one end of the electrode 10 is to receive power, the other end can be clipped off and insulated. In accordance with design practice, the diameter of the helical coil 12 is limited by the diameter of the particular wire or metallic conductor which is employed. An approximation of the minimum outside diameter of the helical coil 12 is that it should not be wound to be less than three times the diameter of the wire. The diameter of wire stock which has heretofore been employed and is suitable for most foreseeable uses is in the range less than ⅛ of an inch.

FIG. 2 shows an alternative formation of an electrode 22 which has an increased current carrying capability and much greater exposed surface throughout the electrode. In this embodiment, seven interior conductors 24 extend lengthwise within the helical coil 12, the entire conductor assembly being overlaid with a helical insulative sheath 16. Once again, the helical insulative sheath 16 would be cut off from tube stock having an interior diameter slightly less than the outer diameter of the helical coil 12 such that suitable spaces would exist between helical turns to allow adequate flow-through of the surrounding liquid. Any number of interior wires 24 can be lead through the helical coil 12, depending upon the particular usage and current requirements, and in such plural conductor devices it is preferable to make periodic spot welds along the length of the electrode 22 to insure good electrical contact and structural stability.

FIG. 3 shows an exemplary usage of a helically wound electrode 30, constructed in the manner of electrode 10 of FIG. 1, i.e., having a single interior conductor 14. The electrode 30 is adapted for usage in this instance within a spiral heat exchanger 32. The spiral heat exchanger 32 illustrates one of many similar types of vessel wherein one material is passed in close, heat conductive proximity to another material for the purpose of effecting heating or cooling in a manner well known in the art. In the particular heat exchanger 32, the liquid flow-way is in the form of concentric and alternating spiral fluid passages as will be described.

An interior chamber 34 leads into a spiral flow-way 36 which is led through a plurality of spiral circuits until there is formed an output chamber 38 at the outer extremity of the spiral. In the same manner, but concentrically spiralled, there is a second input chamber 40 leading through continually spiralling passages 42 until joinder with an output chamber 44 at the periphery of the spiral network. The open side of spiral flow-way 36 is closed or sealed off by the sealing plate 46, shown exploded sideways but which would normally be secured by heavy fasteners to the sides of the heat exchanger 32. Similarly, the flow-way spirals 42 would have their open sides sealed off by a similar sealing plate 48, shown in fastened, sealing position on the opposite side of heat exchanger 32.

When the sealing plate 46 is fastened in place an input conduit 50 is aligned for communication with the interior chamber 34. In this particular showing, this input would be used for the cooling or heating fluid so that its passage would proceed from the interior chamber 34 through the flow-way spiral 36 to the output chamber 38 and then through the exit conduit 52 for return to a suitable fluid processing system associated with the heat exchanger 32. Similarly, the sealing plate 48 extends an input conduit 54 where the particular fluid to be processed can be charged into the heat exchanger 32. The fluid is charged through the conduit 54 into the interior chamber 40 whereupon it flows around the spiral flow-way 42 in heat exchanging relationship with the flow-way 36 and then, from output chamber 44, the processed fluid is available at the exit conduit 56 for storage, further processing, or whatever.

The electrode 30 (similar to electrode 10 of FIG. 1) is led through all passages of the heat exchanger 32 wherein the corrosive liquid under process is flowing. Thus, the spiral electrode 30 can be led in at the input conduit 54 into the interior chamber 40 and around the spiral flow-way 42 until it is finally brought through the output chamber 44 and exit conduit 56. The free ends of the helical electrode 30 would then be connected to a suitable polarization equipment terminal 58 in order to function for corrosion protection.

The manner of electrode connection and corrosion protection is more clearly shown in the schematic diagram of FIG. 4. The end 30a of the helical electrode 30 (shown as a heavy black line) is introduced at the chamber 40 and continuously led around the spiral flow-way 42 to the output chamber 44 and then out through exit conduit 56 where the electrode end 30b is connected back for shorting connection to end 30a. The helical electrode ends 30a and 30b are connected to the terminal 58, the negative or auxiliary electrode of a suitable corrosion protection system such as the anodic polarization equipment 62. The positive lead 64 from the anodic polarization equipment 62 is attached to the body or metallic structure of the heat exchanger 32, as shown connected at a point 66. Also, in accordance with corrosion protection requirements, a suitable reference electrode is immersed in ionic contact with the corrosive solution within the spiral flow-way 42. This may be carried out by insertion of a sensing electrode 68, maintained in contact with the solution by a suitable ionic juncture, and connected by lead 70 to the polarization equipment 62. In one application the system provided good protection where the sensing or reference electrode 68 was placed at the fluid input point as shown.

The exemplary system is shown in connection with an anodic polarization equipment 62. A suitable anodic polarization equipment is the particular subject matter of the aforementioned U.S. Patent No. 3,127,337, entitled, "Anodic Passivation System," and which patent is assigned to the present assignee. Although the helical electrode 30 is shown in use with the anodic polarization equipment 62, it should be understood that cathodic protection equipment, as well as controlled potential protection equipment (alternate application of cathodic and anodic currents), may be utilized with the similar electrodes. The construction of the electrodes would then depend upon the particular application and the composition of the vessel-electrolyte system.

The helically wound type of flexible electrode has been tested in a steel heat exchanger unit similar to that of heat exchanger 32 (FIG. 3), and it has proven to be highly successful. In the particular equipment, the helical electrode (corresponding to 30 in FIG. 3) was formed from $\frac{1}{16}$ inch Hastelloy C wire employing one interior conductor (such as interior conductor 14 of FIG. 1). The overall diameter of the helically wound coil was about $\frac{3}{16}$ inch and the electrically insulative sheathing was cut (helically) from Kel-F tube stock having an inside diameter of about $\frac{5}{32}$ inch such that, when it was wound on the helically wound electrode, a suitable flow-through gap existed between each of the helical turns. The heat exchanger was employed for cooling high concentration sulphuric acid which was introduced under heat and pressure. The heat exchanger was operated continuously for seven months whereupon inspection revealed that the steel heat exchanger had suffered no corrosion and the wire material of the helically wound electrode was in no way deteriorated.

As previously explained, it is foreseeable that a great many corrosion control applications will arise which can only be fulfilled by using a flexible, insulated electrode as disclosed herein. The many vessel interiors which are characterized by geometrically complex configurations can be adequately protected from corrosion by polarization systems employing the particular type of electrode. It should be understood that there are very many materials which would be suitable for construction of the electrode, both the wire conductor components and the helically wound plastic insulator tubing. However, in the highly caustic or highly acidic vessel-corrosive solution systems wherein adequate corrosion protection becomes very important, the particular materials used will be limited somewhat by their reactivities with the solution in the presence of high electric or ionic charge.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:
1. A flexible electrode for electrically contacting a solution comprising:
   a helically wound electrical conductor; and
   a helically wound discontinuous electrical insulator disposed around said wound conductor.
2. A flexible electrode for electrically contacting a solution, comprising:
   a metallic conductor formed into a coiled spring-shape and having at least one end extending for electrical power connection; and
   a coiled spring-shaped insulator disposed as a discontinuous sheath around said coiled spring-shaped metallic conductor.
3. A flexible electrode as set forth in claim 2 which is further characterized to include:
   conductor means disposed within said helically wound metallic conductor and in electrical contact therewith.
4. A flexible electrode as set forth in claim 2 which is further characterized to include:
   a plurality of conductor means disposed within said helically wound metallic conductor and each being in electrical contact with said helically wound conductor.
5. A flexible electrode for immersion in a solution to provide electrical contact therewith, comprising:
   a helically wound metallic conductor having at least one end extending for electrical power connection; and
   a helically wound, resilient insulator disposed to contain said metallic conductor with allowance of flow-through spaces between each helical turn.
6. A liquid contacting flexible electrode comprising:
   a metallic conductor which is helically wound to have a first helix angle; and
   electrically insulative material in the form of a helical winding which is disposed around said metallic conductor in discontinuous overlay and which is formed to have a second helix angle.
7. A flexible electrode as set forth in claim 6 which is further characterized to include:
   a conductor element extending along the longitudinal axis of said helically wound metallic conductor and in electrical contact therewith.
8. A flexible electrode for contacting liquids within geometrically complex containers comprising:
   a first conductor;
   a second metallic conductor helically wound around said first conductor and in electrical contact therewith; and
   electrical and thermal insulator material formed as a helix and being disposed around said second metallic conductor winding in discontinuous overlay.
9. In combination with a heat exchanger having a curved passageway therethrough which is adapted to receive a corrosive solution, a flexible electrode extending at least partially through said passageway, comprising:
   a helically wound electrical conductor; and
   a sheath of electrical insulating material extending around and along the length of the electrical conductor, said sheath having openings therein to expose said electrical conductor to the corrosive solution in the heat exchanger passageway.
10. In combination with a heat exchanger having a curved passageway therethrough which is adapted to receive a corrosive solution, a flexible electrode extending at least partially through said passageway, comprising:
    a helically wound electrical conductor;
    a conductor element disposed along the helical axis of said wound conductor and in electrical contact therewith; and a sheath of heat resistant, electrically insulative material in the form of a helix and enclosing said helically wound conductor such that flow-through gaps exist between each helical turn of said insulative material to allow contact between the corrosive solution and the electrical conductor at all points through said passageway.

11. A liquid contacting flexible electrode comprising:
a helical electrode consisting of a helix wound from conductive material such that adjacent helical turns are proximate;
a central conductor extending along the axis of said helical electrode in electrical contact therewith; and
a thermally and electrically insulative sheath disposed helically around said helical electrode to provide flow-through gaps between each adjacent helical turn of said sheath.

References Cited

UNITED STATES PATENTS

| | | | |
|---|---|---|---|
| 915,846 | 3/1909 | Friedheim | 204—290 |
| 1,506,306 | 8/1924 | Kirkaldy | 204—196 |
| 2,765,273 | 10/1956 | Lobos | 204—197 |
| 2,795,541 | 6/1957 | Muller | 204—290 |
| 2,908,623 | 10/1959 | Doring | 204—196 |
| 2,929,769 | 3/1960 | Newell et al. | 204—290 |
| 2,941,935 | 6/1960 | Miller et al. | 204—196 |
| 3,012,958 | 12/1961 | Vixler | 204—290 |
| 3,022,242 | 2/1962 | Anderson | 204—290 |
| 3,182,007 | 5/1965 | Hutchison et al. | 204—196 |

HOWARD S. WILLIAMS, *Primary Examiner.*

T. TUNG, *Assistant Examiner.*